(12) United States Patent
Takemoto

(10) Patent No.: US 9,950,572 B2
(45) Date of Patent: Apr. 24, 2018

(54) PNEUMATIC TIRE

(71) Applicant: Sumitomo Rubber Industries, Ltd., Kobe-shi, Hyogo (JP)

(72) Inventor: Yoshiaki Takemoto, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 820 days.

(21) Appl. No.: 14/229,193

(22) Filed: Mar. 28, 2014

(65) Prior Publication Data

US 2014/0305559 A1    Oct. 16, 2014

(30) Foreign Application Priority Data

Apr. 11, 2013   (JP) ................................. 2013-083220

(51) Int. Cl.
  *B60C 11/12*   (2006.01)
  *B60C 11/03*   (2006.01)

(52) U.S. Cl.
  CPC .......... *B60C 11/0304* (2013.01); *B60C 11/12* (2013.01); *B60C 11/1236* (2013.01); *B60C 2011/039* (2013.01); *B60C 2011/0348* (2013.01); *B60C 2011/0353* (2013.01); *B60C 2011/0365* (2013.01); *B60C 2011/0372* (2013.01); *B60C 2011/0381* (2013.01); *B60C 2011/0383* (2013.01); *B60C 2011/0388* (2013.01); *B60C 2011/129* (2013.01); *B60C 2011/1295* (2013.01)

(58) Field of Classification Search
  CPC ......... B60C 11/0304; B60C 2011/0353; B60C 2011/0381; B60C 2011/0372
  USPC ................. 152/209.8–209.9, 209.28, 901; D12/505–532
  See application file for complete search history.

(56) References Cited

U.S. PATENT DOCUMENTS

| | | | |
|---|---|---|---|
| D700,878 S | * | 3/2014 | Takemoto .................. D12/523 |
| 2005/0269004 A1 | | 12/2005 | Miyabe et al. |
| 2011/0061780 A1 | * | 3/2011 | Mita .................... B60C 11/1392 152/209.8 |

FOREIGN PATENT DOCUMENTS

| | | | |
|---|---|---|---|
| JP | 09058223 A | * | 3/1997 |
| JP | 2003-285610 A | | 10/2003 |
| JP | 2012171479 A | * | 9/2012 |

OTHER PUBLICATIONS

Machine Translation: JP 2012171479 A; Miyasaka, Atsushi; no date.*
Machine Translation: JP 09058223 A; Gojo, Atsushi; no date.*

* cited by examiner

*Primary Examiner* — Michael H. Wilson
*Assistant Examiner* — Kendra Ly
(74) *Attorney, Agent, or Firm* — Birch, Stewart, Kolasch & Birch, LLP

(57) ABSTRACT

A pneumatic tire has a tread portion provided with an asymmetrical tread pattern and comprising an inboard shoulder land portion, an inboard shoulder main groove, an inboard middle land portion, an inboard crown main groove, a center land portion, an outboard crown main groove, an outboard middle land portion, an outboard shoulder main groove, and an outboard shoulder land portion. The inboard middle land portion is provided with inboard middle axial grooves extending from the inboard shoulder main groove and each comprising a main portion and a turnback portion. The inboard shoulder land portion is provided with inboard shoulder sipes extending from the inboard shoulder main groove.

14 Claims, 8 Drawing Sheets

PNEUMATIC TIRE

BACKGROUND OF THE INVENTION

The present invention relates to a pneumatic tire, more particularly to an asymmetrical tread pattern capable of improving noise performance without sacrificing wet performance and steering stability.

In general, pneumatic tires for example passenger tires are provided in the tread portion with tread grooves such as circumferential grooves and axial grooves.

If tread grooves are increased in the volume in order to improve wet performance of the tire, there is a problem such that the rigidity of the tread portion is decreased and the steering stability is deteriorated. Further, air tube resonance becomes liable to occurs when the groove volume is increased, therefore there is a problem such that noise performance is deteriorated. Thus, the wet performance is contradictory to the noise performance and steering stability.

In order to solve such contradictory problem, Japanese Patent Application Publication No. 2003-285610 discloses a pneumatic tire in which a circumferentially continuously extending rib is formed on each side of a circumferential groove to isolate the circumferential groove.

In such a pneumatic tire, however, there is room for simultaneous improvement in the steering stability, wet performance and noise performance.

SUMMARY OF THE INVENTION

It is therefore, an object of the present invention to provide a pneumatic tire in which the noise performance can be improved without sacrificing the wet performance and the steering stability.

According to the present invention, a pneumatic tire comprises a tread portion provided with a tread pattern of left-right asymmetry and having an outboard tread edge and an inboard tread edge, the tread pattern comprising circumferentially continuously extending main grooves which are an inboard shoulder main groove, an inboard crown main groove, an outboard crown main groove, and an outboard shoulder main groove, whereby the tread portion is axially divided into an inboard shoulder land portion between the inboard shoulder main groove and the inboard tread edge, an inboard middle land portion between the inboard crown main groove and the inboard shoulder main groove, a center land portion between the inboard crown main groove and the outboard crown main groove, an outboard middle land portion between the outboard crown main groove and the outboard shoulder main groove, and an outboard shoulder land portion between the outboard shoulder main groove and the outboard tread edge, wherein the width of the outboard shoulder main groove is smaller than the width of the inboard shoulder main groove, the inboard middle land portion is provided with a plurality of inboard middle axial grooves arranged circumferentially of the tire at intervals, each of the inboard middle axial grooves comprises a main portion which extends from the inboard shoulder main groove toward the tire equator, while inclining with respect to the tire axial direction to one tire circumferential direction, and a turnback portion which extends from the main portion toward the other tire circumferential direction and terminates within the inboard middle land portion, the inboard shoulder land portion is provided with a plurality of inboard shoulder sipes arranged circumferentially of the tire at intervals, and each of the inboard shoulder sipes extends from the inboard shoulder main groove to the inboard tread edge.

In the present invention, since the tread pattern is of left-right asymmetry (asymmetry about the tire equator), the mounting position of the tire (the inside and outside of the tire) is specified. Thus, the tread portion has the outboard tread edge to be positioned away from the center of the vehicle body and the inboard tread edge to be positioned close to the center of the vehicle body. For example, the sidewall portion to be located on outside when installed on the vehicle is provided with an indication such as "outside", and the sidewall portion to be located on inside is provided with an indication such as "inside".

According thereto, in this application including specification and claims, the terms "outboard" and "inboard" are used toward the outboard tread edge and inboard tread edge, respectively, to refer relative positions in the tire axial direction.

The terms "axially inner", "axially inward" and the like are used toward the tire equator, and the terms "axially outer", "axially outward" and the like are used toward the tread edge in order to refer relative positions in the tire axial direction.

Further, in this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

Getting back to effects of the pneumatic tire according to the present invention, since the tread portion is provided with the wide inboard shoulder main groove and the narrow outboard shoulder main groove, the rigidity of the tread portion is increased in an outboard part subjected to larger loads during cornering in comparison with an inboard part, therefore, the steering stability during cornering can be improved. Further, since the turnback portions of the inboard middle axial grooves reduce the axial rigidity of the inboard middle land portion to allow relatively large deformation during running, thereby the occurrence of standing wave in the inboard shoulder main groove is hindered by the deformed groove sidewall, and the generation of air tube resonance sound from the inboard shoulder main groove is prevented to improve the noise performance. Further, the inboard shoulder sipes can improve the wet performance. As a result, the noise performance can be improved without sacrificing the wet performance and the steering stability.

The pneumatic tire according to the present invention may further include the following features (1)-(7):
(1) the turnback portion extends parallel with the tire circumferential direction;
(2) the number of the inboard shoulder sipes is more than the number of the inboard middle axial grooves;
(3) the inboard middle land portion is provided with a plurality of inboard middle sipes arranged circumferentially of the tire at intervals, and each of the inboard middle sipes extends axially outwardly from the inboard crown main groove and terminates within the inboard middle land portion;
(4) the axial outer ends of the inboard middle sipes are located axially outside the turnback portions;
(5) the outboard shoulder land portion is provided with a non-grooved rib-like part extending circumferentially of the tire and disposed adjacently to the outboard shoulder main groove;
(6) the inboard middle axial grooves have a width, and the inboard crown main groove and the outboard crown main groove have a width more than the width of the inboard middle axial grooves;
(7) the inboard crown main groove has a width, and the outboard crown main groove has a width same as the width of the inboard crown main groove.

DESCRIPTION OF THE PREFERRED EMBODIMENTS

Figure 1:
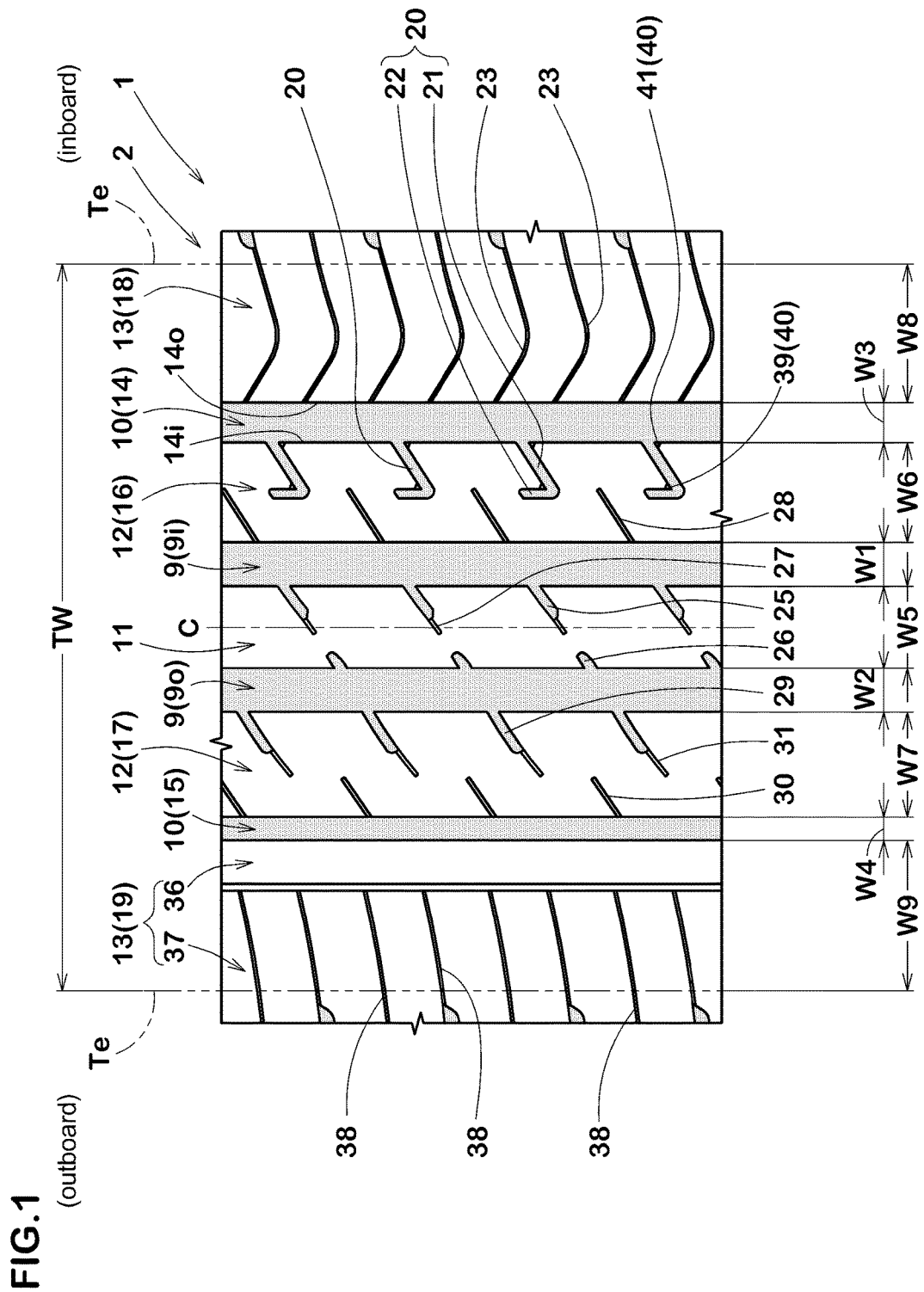
FIG. 1 is a developed partial view of a tread portion of a pneumatic tire as an embodiment of the present invention.
Figure 2:
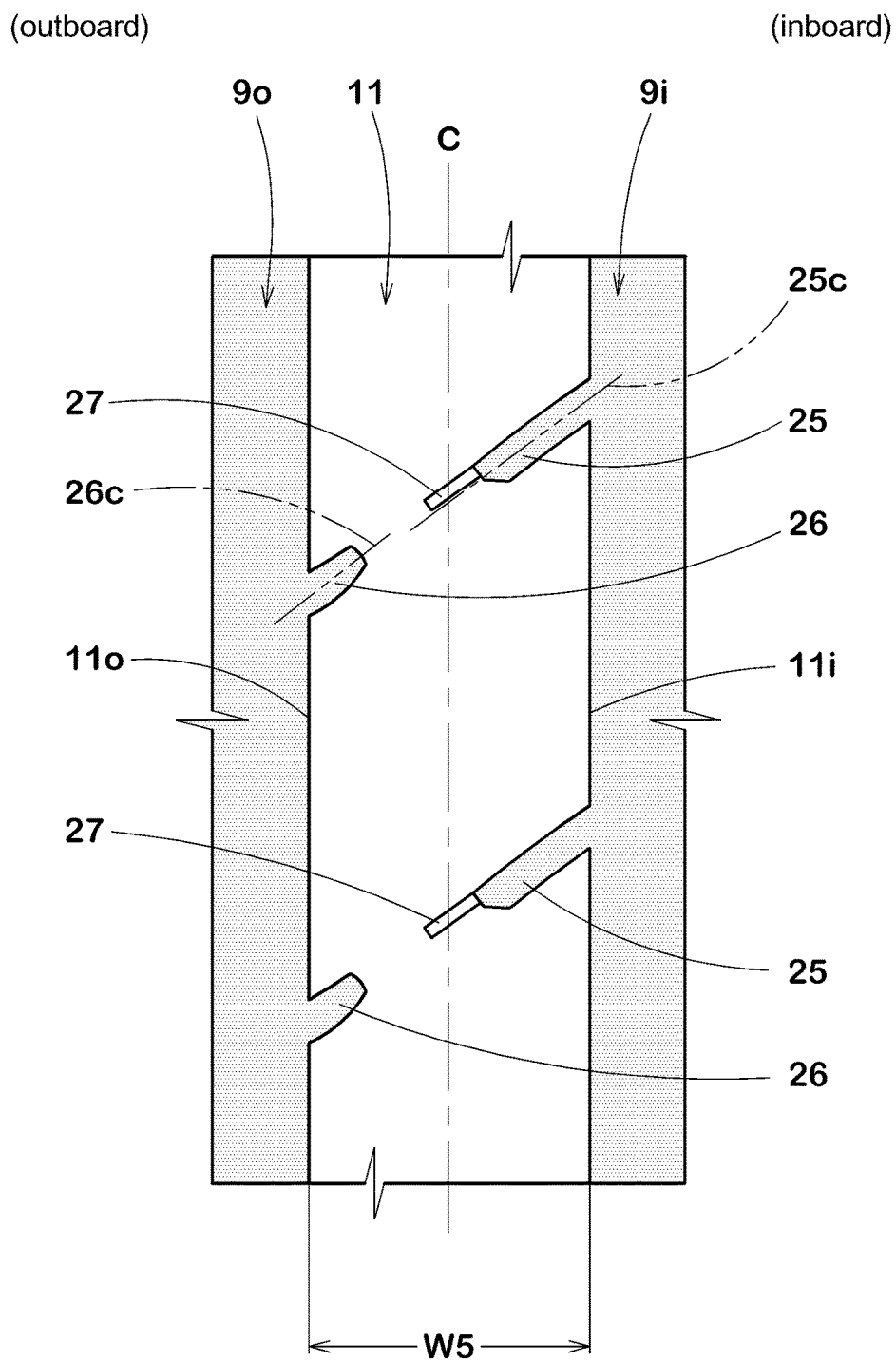
FIG. 2 is an enlarged partial top view of the center land portion thereof.
Figure 3:
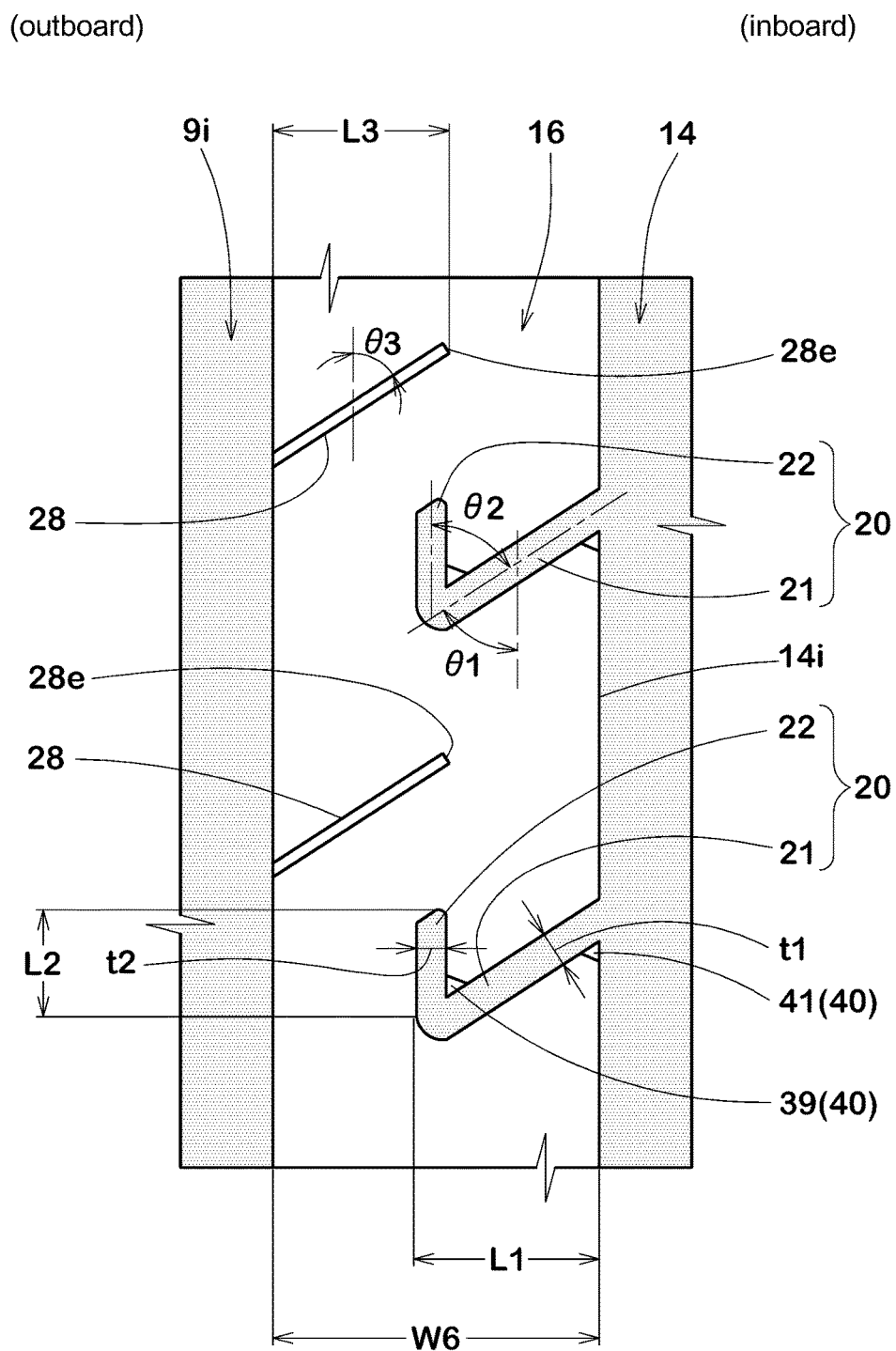
FIG. 3 is an enlarged partial top view of the inboard middle land portion thereof.

Embodiments of the present invention will now be described in detail in conjunction with the accompanying drawings.

As well known in the art, a pneumatic tire comprises a tread portion 2 whose outer surface defines the tread and which is provided with a tread pattern, a pair of axially spaced bead portions mounted on bead seats of a rim, a pair of sidewall portions extending between the tread edges and the bead portions, a carcass extending between the bead portions through the tread portion and the sidewall portions, and a tread reinforcing belt disposed radially outside the carcass in the tread portion.

According to the present invention, the tread portion 2 is provided with
a pair of circumferentially continuously extending crown main grooves 9 disposed one on each side of the tire equator C, and
a pair of circumferentially continuously extending shoulder main grooves 10 disposed axially outside the respective crown main grooves 9.

Each of the crown main grooves 9 and shoulder main grooves 10 extends straight and has a constant width. However, it is also possible that the crown main grooves 9 and the shoulder main grooves 10 are configured as a zigzag or wavy groove. Further, the groove width may be varied along the groove length.

The crown main grooves 9 are
the inboard crown main groove 9$i$ having a width W1 and the outboard crown main groove 9o having a width W2. Preferably, the width W1 and the width W2 are set in a range of from 0.10 to 0.15 times the tread width TW in order to provide a good wet performance without deteriorating the rigidity of the tread crown region.

It is preferable that the width W1 is the same as the width W2 in order to improve the drainage in the tread crown region.

The shoulder main grooves 10 are
the inboard shoulder main groove 14 having a width W3 and the outboard shoulder main groove 15 having a width W4. Preferably, the widths W3 and W4 are less than the width of the crown main groove 9 in order to increase the pattern rigidity in the tread shoulder region subjected to a large load during cornering and thereby to improve the steering stability.

The width W4 of the outboard shoulder main groove 15 is less than the width W3 of the inboard shoulder main groove 14. The width ratio W4/W3 is preferably set in a range of not more than 0.85, more preferably not more than 0.82, but not less than 0.75, more preferably not less than 0.78 in order to increase the pattern rigidity in an outboard tread part whose contribution to the improvement in the steering stability is higher, than in an inboard tread part, and thus to further improve the steering stability.

By the above-mentioned main grooves 9 and 10, the tread portion 2 is axially divided into
a center land portion 11 between the inboard crown main groove 9$i$ and the outboard crown main groove 9o,
a pair of middle land portions 12 between the crown main grooves 9 and the shoulder main grooves 10, and
a pair of shoulder land portions 13 between the shoulder main grooves 10 and the tread edges Te.

It is preferable that the axial width W5 of the center land portion 11 is set in a range of not less than 0.10 times, more preferably not less than 0.12 times, but not more than 0.16 times, more preferably not more than 0.14 times the tread width TW in order to provide steering stability without deteriorating the wet performance.

The center land portion 11 is provided with a plurality of inboard center axial grooves 25 extending from the inboard crown main groove 9$i$ toward the tire equator C and arranged circumferentially of the tire at intervals, and a plurality of outboard center axial grooves 26 extending from the outboard crown main groove 90 toward the tire equator C and arranged circumferentially of the tire at intervals in order to improve the drainage in the tread crown region.

All the inboard center axial grooves 25 extend substantially straight from the inboard crown main groove 9i toward the tire equator C, while inclining with respect to the tire axial direction to one circumferential direction in order to reduce the rigidity at the inboard edge 11i of the center land portion 11 and thereby hinder the generation of air tube resonance sound in the inboard crown main groove 9i, without deteriorating the wet performance.

Each of the inboard center axial grooves 25 continues to a center sipe 27 and terminates within the center land portion 11.

The center sipe 27 inclines with respect to the tire axial direction and terminates within the center land portion 11 not to make the rigidity of the center land portion 11 insufficient.

All the outboard center axial grooves 26 extend from the outboard crown main groove 90 toward the tire equator C, while inclining with respect to the tire axial direction to one circumferential direction, and terminate within the center land portion 11.

It is preferable that the outboard center axial grooves 26 have an axial length shorter than the inboard center axial grooves 25 in order to relatively increase the rigidity at the outboard edge 11o of the center land portion 11 and thereby improve the steering stability.

It is desirable that all of the inboard and outboard center axial grooves 25 and 26 are inclined in the same direction, and preferably the inclination angles with respect to the tire axial direction are identical.

It is preferable that the inboard center axial grooves 25 and the outboard center axial grooves 26 are arranged such that an extension of the widthwise center line 25c of each of the inboard center axial grooves 25 passes through the width of one of the outboard center axial grooves 26, and an extension of the widthwise center line 26c of each of the outboard center axial grooves 26 passes through the width of one of the inboard center axial grooves 25 in order to optimize the rigidity distribution in the center land portion 11 and thereby improve the uneven wear performance.

The above-mentioned middle land portions 12 are the inboard middle land portion 16 having an axial width W6 and the outboard middle land portion 17 having an axial width W7. It is preferable that the axial width W6 is more than the axial width W5 of the center land portion 9, and the axial width W7 is more than the axial width W5.

The axial widths W6 and W7 are preferably set in a range of not less than 1.18 times, more preferably not less than 1.20 times, but not more than 1.26 times, more preferably not more than 1.24 times the axial width W5 in order to relatively increase the rigidity of the middle land portion 12 subjected to a larger load than the center land portion 11 during cornering and thereby improve the steering stability during cornering. Thus, such inboard middle land portion 16 and outboard middle land portion 17 can improve the steering stability without sacrificing the wet performance.

The inboard middle land portion 16 is provided with inboard middle axial grooves 20 arranged circumferentially of the tire at intervals, and inboard middle sipes 28 arranged circumferentially of the tire at intervals.

The inboard middle axial grooves 20 are each composed of a main portion 21 extending from the inboard shoulder main groove 14 toward the tire equator C, while inclining with respect to the tire axial direction to one circumferential direction, and a turnback portion 22 extending toward the other circumferential direction from the main portion 21 and terminating within the inboard middle land portion 16.

Such main portion 21 and turnback portion 22 reduce the rigidity in an axially outside part of the inboard middle land portion 16, in particular, the rigidity of the corner 39 formed between the main portion 21 and the turnback portion 22.

Thereby, during running, the axially inner groove-sidewall face 14i of the inboard shoulder main groove 14 can make larger axial deformation than the axially outer groove-sidewall face 14o. As a result, the occurrence of standing wave in the inboard shoulder main groove 14 is hindered, and the generation of air tube resonance sound from the inboard shoulder main groove 14 can be prevented.

Since the axial grooves 20 having such configuration are disposed in the inboard middle land portion 16 not subjected to large loads during cornering, the noise performance can be improved without deteriorating the steering stability.

The main portion 21 of the inboard middle axial groove 20 is substantially straight from its axially outer end at the inboard shoulder main groove 14 to its axially inner end at the midpoint of the axial width of the inboard middle land portion 16.

If the angle θ1 of the main portion 21 with respect to the tire circumferential direction becomes small, there is a possibility that uneven wear occurs in the inboard middle land portion 16. If the angle θ1 becomes large, there is a possibility that the axial rigidity of the inboard middle land portion 16 can not be suitably reduced.

Therefore, the angle θ1 of the main portion 21 is preferably set in a range of not less than 50 degrees, more preferably not less than 55 degrees, but not more than 70 degrees, more preferably not more than 65 degrees with respect to the tire circumferential direction.

If the axial length L1 of the main portion 21 becomes short, there is a possibility that the rigidity of the inboard middle land portion 16 can not be suitably reduced. If the axial length L1 becomes long, there is a possibility that the rigidity of the inboard middle land portion 16 is excessively reduced and the steering stability is deteriorated. Therefore, the axial length L1 of the main portion 21 is preferably set in a range of not less than 0.40 times, more preferably not less than 0.45 times, but not more than 0.60 times, more preferably not more than 0.55 times the axial width W6 of the inboard middle land portion 16.

The width t1 of the main portion 21 is set in a range of from 2.5 to 3.5 mm for example from a point of view of the rigidity of the inboard middle land portion 16 and the drainage.

If the angle θ2 formed between the main portion 21 and the turnback portion 22 becomes small, there is a possibility that uneven wear occurs in the inboard middle land portion 16. If the angle θ2 becomes large, there is a possibility that the rigidity of the inboard middle land portion 16 can not be suitably reduced.

Therefore, the angle θ2 formed between the main portion 21 and the turnback portion 22 is preferably set in a range of not less than 50 degrees, more preferably not less than 55 degrees, but not more than 70 degrees, more preferably not more than 65 degrees.

Preferably, the turnback portion 22 extends parallel with the tire circumferential direction in order to suitably reduce the axial rigidity of the inboard middle land portion 16.

If the circumferential length L2 of the turnback portion 22 becomes short, there is a possibility that the wet performance is deteriorated. If the circumferential length L2 becomes long, there is a possibility that the rigidity of the inboard middle land portion 16 is excessively reduced and the steering stability is deteriorated.

Therefore, the circumferential length L2 of the turnback portion 22 is preferably not less than 0.5 times, more preferably not less than 0.55 times, but not more than 0.7 times, more preferably not more than 0.65 times the axial length L1 of the main portion 21.

The width t2 of the turnback portion 22 is set in a range of from 2.0 to 3.0 mm for example for the rigidity of the inboard middle land portion 16 and the drainage.

The corner 39 formed between the main portion 21 and the turnback portion 22 is preferably chamfered.

Also the corner 41 formed between the inboard shoulder main groove 14 and the main portion 21 is preferably chamfered.

Such chamfer 40 can prevent uneven wear and a tear starting from the corner.

All the inboard middle sipes 28 extend straight axially outwardly from the inboard crown main groove 9i and terminate within the inboard middle land portion 16 in order that the sipes effectively exert their edge effect without largely decreasing the rigidity of the inboard middle land portion 16, and thereby the wet performance is improved without sacrificing the steering stability.

If the axial length L3 of the inboard middle sipes 28 becomes short, there is a possibility that the wet performance can not be effectively improved. If the axial length L3 becomes long, there is a possibility that the steering stability is deteriorated.

Therefore, the axial length L3 of the inboard middle sipes 28 is preferably not less than 0.40 times, more preferably not less than 0.50 times, but not more than 0.70 times, more preferably not more than 0.60 times the axial width W6 of the inboard middle land portion 16.

The axial outer ends 28e of the inboard middle sipea 28 are preferably located axially outside the turnback portions 22 in order to further improve the wet performance.

The inboard middle sipes 28 and the main portions 21 are preferably inclined in the same direction. Preferably, the inclination angle θ3 of the inboard middle sipes is set in a range of not less than 50 degrees, more preferably not less than 55 degrees, but not more than 70 degrees, more preferably not more than 65 degrees with respect to the tire circumferential direction.

Such inboard middle sipes 28 can distribute the circumferential rigidity of the inboard middle land portion 16 in a well balanced manner from the axially inside to the axially outside to thereby improve the steering stability.

Figure 4:
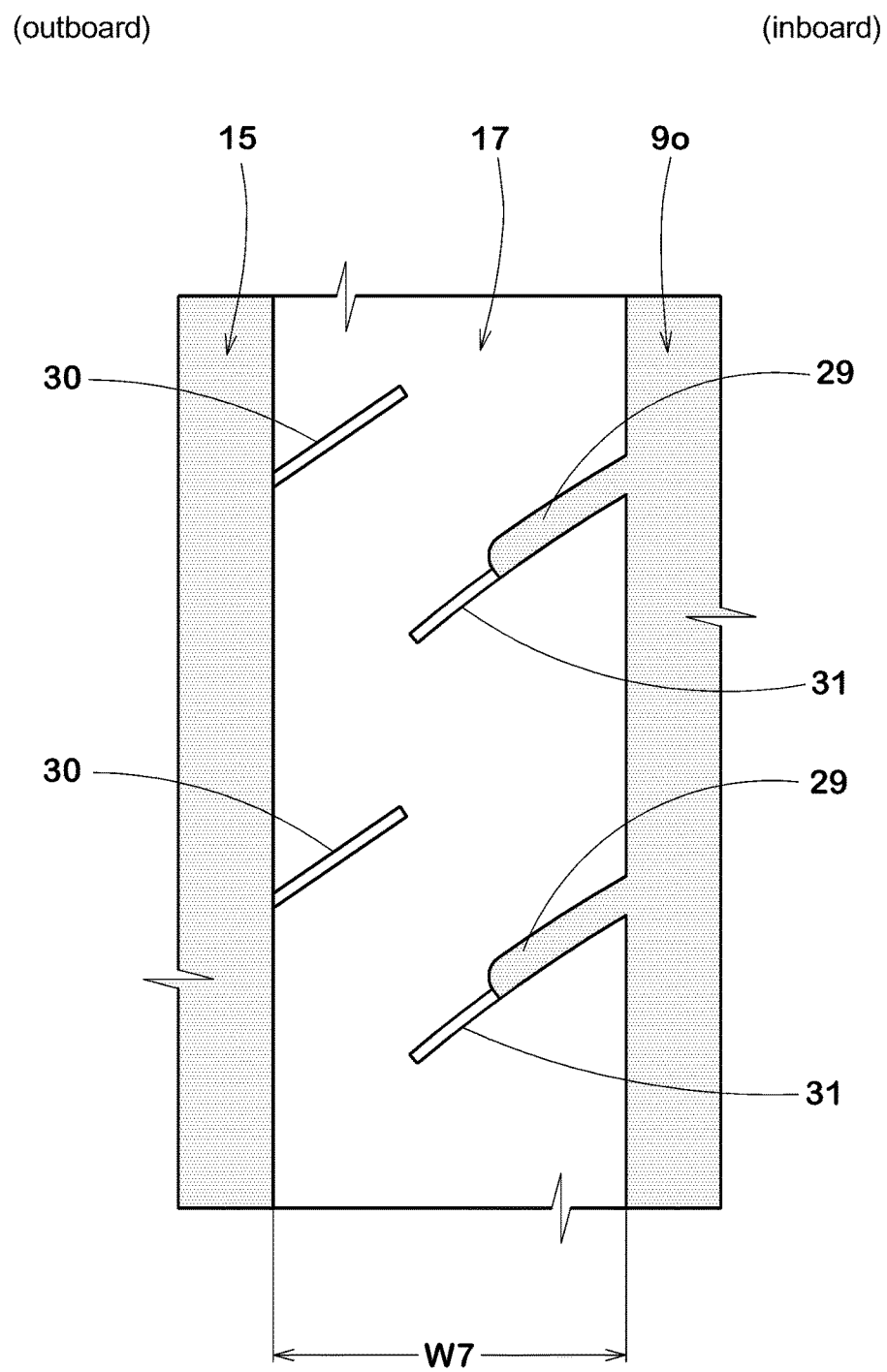
FIG. 4 is an enlarged partial top view of the outboard middle land portion thereof.

The outboard middle land portion 17 are, as shown in FIG. 4, provided with
a plurality of outboard middle axial grooves 29 arranged circumferentially of the tire at intervals and extending from the outboard crown main groove 9o into the outboard middle land portion 17, and
a plurality of outboard middle sipes 30 arranged circumferentially of the tire at intervals and extending from the outboard shoulder main groove 15 into the outboard middle land portion 17.

All the outboard middle axial grooves 29 are inclined with respect to the tire axial direction to one circumferential direction. The outboard middle axial grooves 29 extend substantially straight.

Each of the outboard middle axial grooves 29 continues to a middle auxiliary sipe 31 and terminates within the outboard middle land portion 17.

The middle auxiliary sipe 31 extends parallel with the outboard middle axial groove 29 and terminates within the outboard middle land portion 17.

Such middle auxiliary sipes 31 can exert their edge effect without substantially reducing the rigidity of the outboard middle land portion 17, therefore, it is possible to simultaneously pursue the wet performance and the steering stability.

The width of the outboard middle sipe 30 is smaller than the width of the outboard middle axial groove 29.

The closed ends of the outboard middle sipes 30 are located axially outside the closed ends of the middle auxiliary sipes 31. In the tire circumferential direction, the outboard middle sipes 30 are located between the outboard middle axial grooves 29, in other words, they are staggered.

Such outboard middle sipes 30 can improve the wet performance while maintaining the rigidity in an axially outer part of the outboard middle land portion 17 in a well balanced manner.

The above-mentioned shoulder land portions 13 are the inboard shoulder land portion 18 and the outboard shoulder land portion 19.

Preferably, the axial width W8 of the inboard shoulder land portion 18 is more than the axial width of the center land portion 11 and more than the axial width of the middle land portion 12 in order to provide rigidity in the tread shoulder region and improve the steering stability.

The axial width W8 is preferably not less than 1.30 times, more preferably not less than 1.35 times, but not more than 1.50 times, more preferably not more than 1.45 times the axial width W6 of the inboard middle land portion 16 in order to improve the steering stability while maintaining the wet performance.

Figure 5:
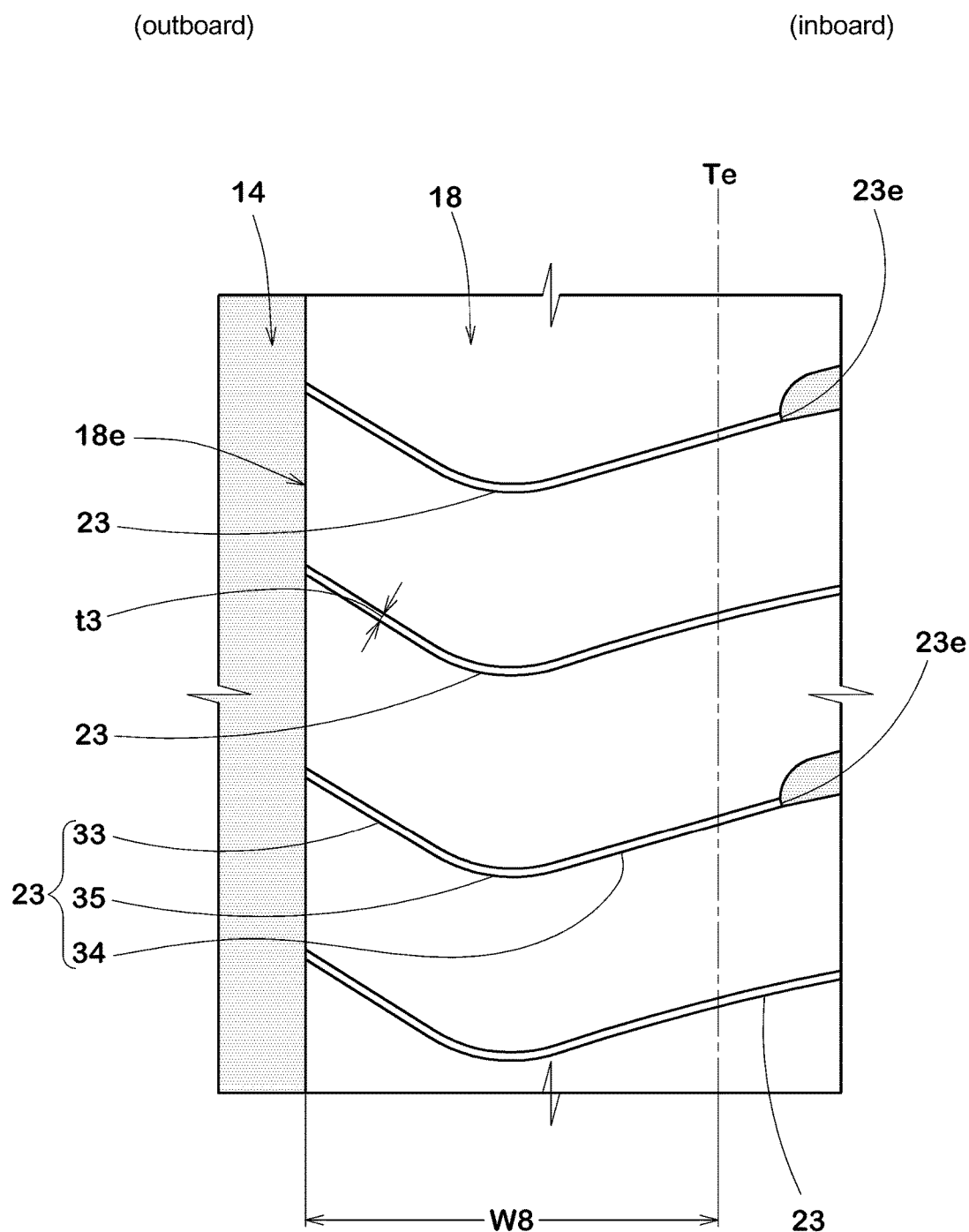
FIG. 5 is an enlarged partial top view of the inboard shoulder land portion thereof.

The inboard shoulder land portion 18 is as shown in FIG. 5 provided with a plurality of inboard shoulder sipes 23 extending from the inboard shoulder main groove 14 to the inboard tread edge Te, in this example axially outwardly beyond the inboard tread edge Te in order to improve the road grip performance of the inboard shoulder land portion 18 during wet running.

Such inboard shoulder sipes 23 exert their edge effect to improve the wet performance. The inboard shoulder sipes 23 do not largely reduce the rigidity of the inboard shoulder land portion 18 since their width is smaller than the width of the inboard middle axial grooves 20. Accordingly, the axially inner groove-sidewall face 14i can make larger deformation than the axially outer groove-sidewall face 14o, and the generation of air tube resonance sound in the inboard shoulder main groove 14 can be effectively suppressed.

Each of the inboard shoulder sipes 23 is composed of an axially inner part 33 extending axially outwardly from the inboard shoulder main groove 14 while inclining with respect to the tire axial direction to one circumferential direction,
an axially outer part 34 extending axially inwardly from the inboard tread edge Te while inclining with respect to the tire axial direction to one circumferential direction same as the axially inner part 33, and a curved portion 35 connecting between the axially inner part 33 and the axially outer part 34 and curved in an arc shape.

The inboard shoulder sipe 23 having such configuration exerts its edge effect in the tire circumferential direction as well as the tire axial direction, and it is possible to improve wet performance.

The width t3 of the inboard shoulder sipe 23 is preferably set in a range of not less than 0.15 times, more preferably not less than 0.18 times, but not more than 0.25 times, more preferably not more than 0.22 times the width t1 of the main portion 21 of the inboard middle axial groove 20 in order to improve the wet performance without deteriorated the steering stability.

The number of the inboard shoulder sipes 23 in the inboard shoulder land portion is preferably more than the number of the inboard middle axial grooves 20 in the inboard middle land portion in order that the occurrence of standing wave in the inboard shoulder main groove 14 can be effectively prevented to improve the noise performance, and further, the edges are increased to improve the wet performance.

In order to effectively derive such advantageous effects, the number of the inboard shoulder sipes 23 is preferably not less than 1.6 times, more preferably not less than 1.7 times, but not more than 2.4 times, more preferably not more than 2.3 times the number of the inboard middle axial grooves 20.

Figure 6:
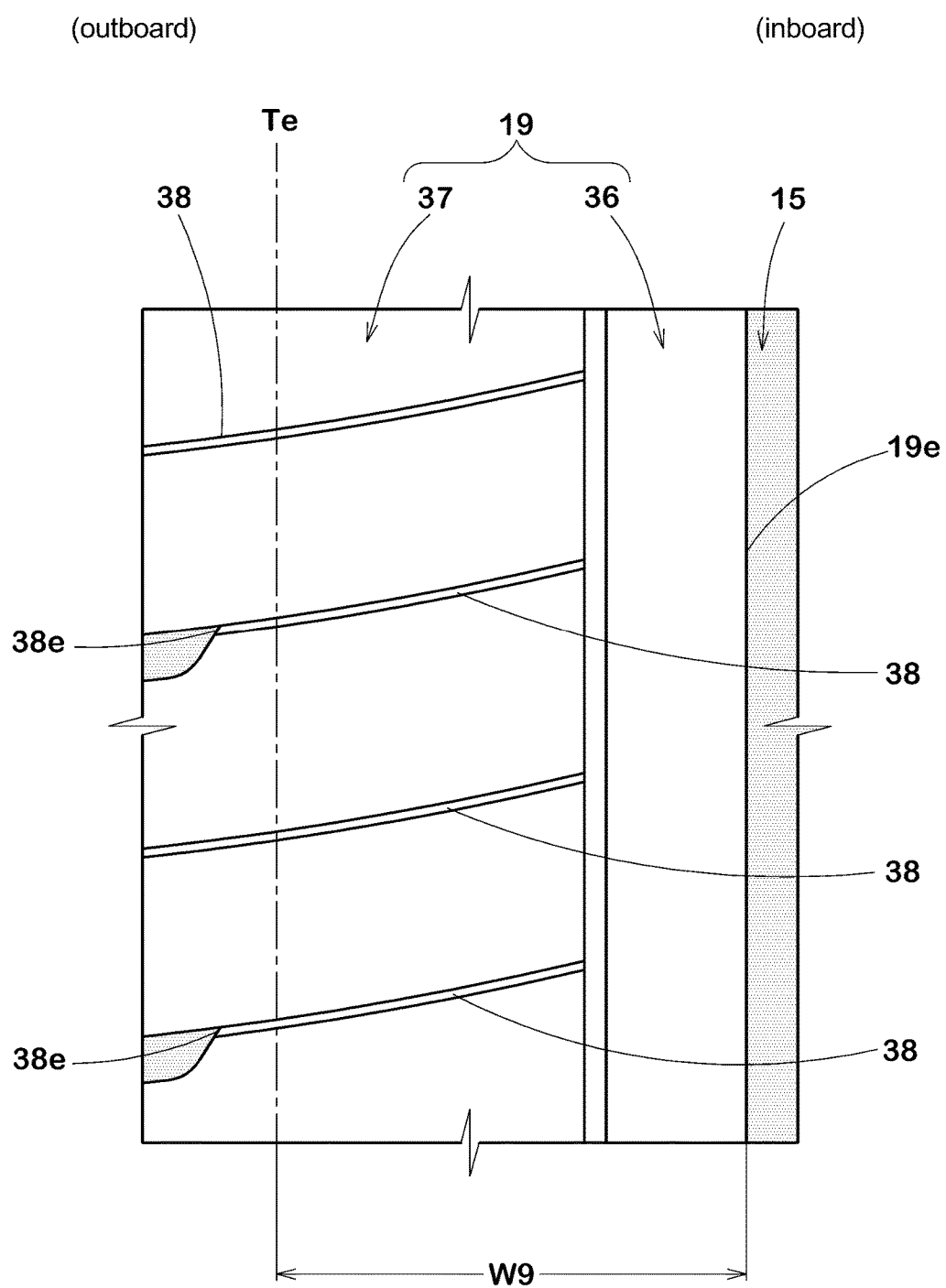
FIG. 6 is an enlarged partial top view of the outboard shoulder land portion thereof.

Since the outboard shoulder land portion 19 is subjected to larger loads during cornering in compare with the inboard shoulder land portion 18, it is preferable that the axial width W9 of the outboard shoulder land portion 19 is more than the axial width W8 of the inboard shoulder land portion 18 as shown in FIG. 1 and FIG. 6.

If the axial width W9 of the outboard shoulder land portion 19 becomes small, there is a possibility that the steering stability is deteriorated. If the axial width W9 becomes large, there is a possibility that the wet performance is deteriorated.

Therefore, the axial width W9 is preferably not less than 1.04 times, more preferably not less than 1.06 times, but not more than 1.12 times, more preferably not more than 1.10 times the axial width W8.

The outboard shoulder land portion 19 includes an axially inner non-grooved rib-like part 36 and an axially outer grooved annular part 37.

The inner non-grooved rib-like part 36 is not provided with any void such as groove, sipe, slot and the like and extends continuously in the tire circumferential direction. The non-grooved rib-like part 36 is located adjacently to the outboard shoulder main groove 15.

Such non-grooved rib-like part 36 can improve the noise performance, and can provide rigidity for the outboard shoulder land portion 19 to improve the steering stability.

The grooved annular part 37 is provided with grooves and/or sipes.

In the grooved annular part 37 in this example, a plurality of axially-extending outboard shoulder sipes 38 are arranged circumferentially of the tire at intervals.

The outboard shoulder sipes 38 are slightly curved.

Such outboard shoulder sipes 38 can exert their edge effect without substantially reducing the axial rigidity of the outboard shoulder land portion 19, therefore, the wet performance can be improved while maintaining the steering stability.

Figure 7:
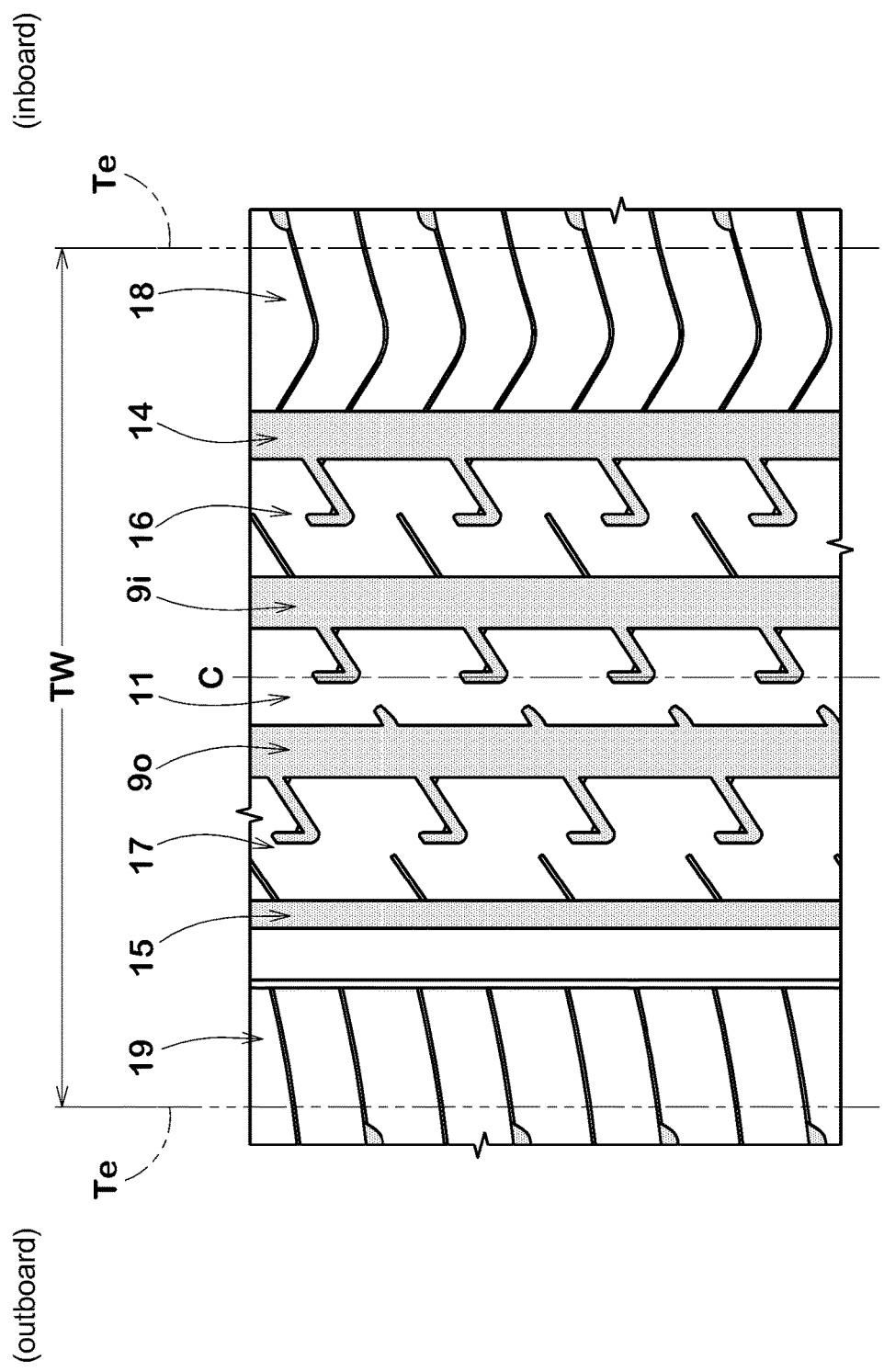
FIG. 7 is a developed partial view of a tread portion as an embodiment of the present invention.

As shown in FIG. 7 as another embodiment of the present invention, the above-mentioned outboard middle axial grooves 29 may be configured in the same manner as the inboard middle axial grooves 20, namely, the groove 29 has a main portion extending from the outboard crown main groove 9o into the outboard middle land portion 17, and inclined with respect to the tire axial direction to one circumferential direction, and a turnback portion extending toward the other circumferential direction from the main portion and terminating within the outboard middle land portion 17.

Such outboard middle axial grooves 29 can prevent the generation of air tube resonance sound in the outboard crown main groove 9o in the same way as explained above in connection with the inboard middle axial groove 20.

Further, as shown in FIG. 7, the above-mentioned inboard center axial grooves 25 may be configured in the same manner as the inboard middle axial grooves 20, namely, the groove 25 has a main portion extending from the inboard crown main groove 9i toward the tire equator C while inclining with respect to the tire axial direction to one circumferential direction, and a turnback portion extending toward the other circumferential direction from the main portion and terminating within the center land portion 11.

In the above-mentioned embodiments shown in FIG. 1 and FIG. 7, all of the main portions 21 of the inboard middle axial grooves 20, the inboard center axial grooves 25 (in FIG. 7, their main portions), the outboard center axial grooves 26 (in FIG. 7, their main portions), the outboard middle axial grooves 29, the axially outer parts 34 of the inboard shoulder sipes 23, the inboard middle sipes 28, the center sipe 27, the middle auxiliary sipes 31, the outboard middle sipes 30, and the outboard shoulder sipes 38 are inclined with respect to the tire axial direction to the same direction.

Comparison Tests

Pneumatic tires of size 215/60R16 (rim size 16×6.53) having specifications shown in Table 1 were prepared and tested for the wet performance, steering stability, and noise performance.

Embodiment tire Ex. 1 had the tread pattern shown in FIG. 1.

Embodiment tire Ex. 2 had the tread pattern shown in FIG. 7.

Embodiment tires Exs. 3-11 had tread patterns modified based on the tread pattern shown in FIG. 1.

Figure 8:
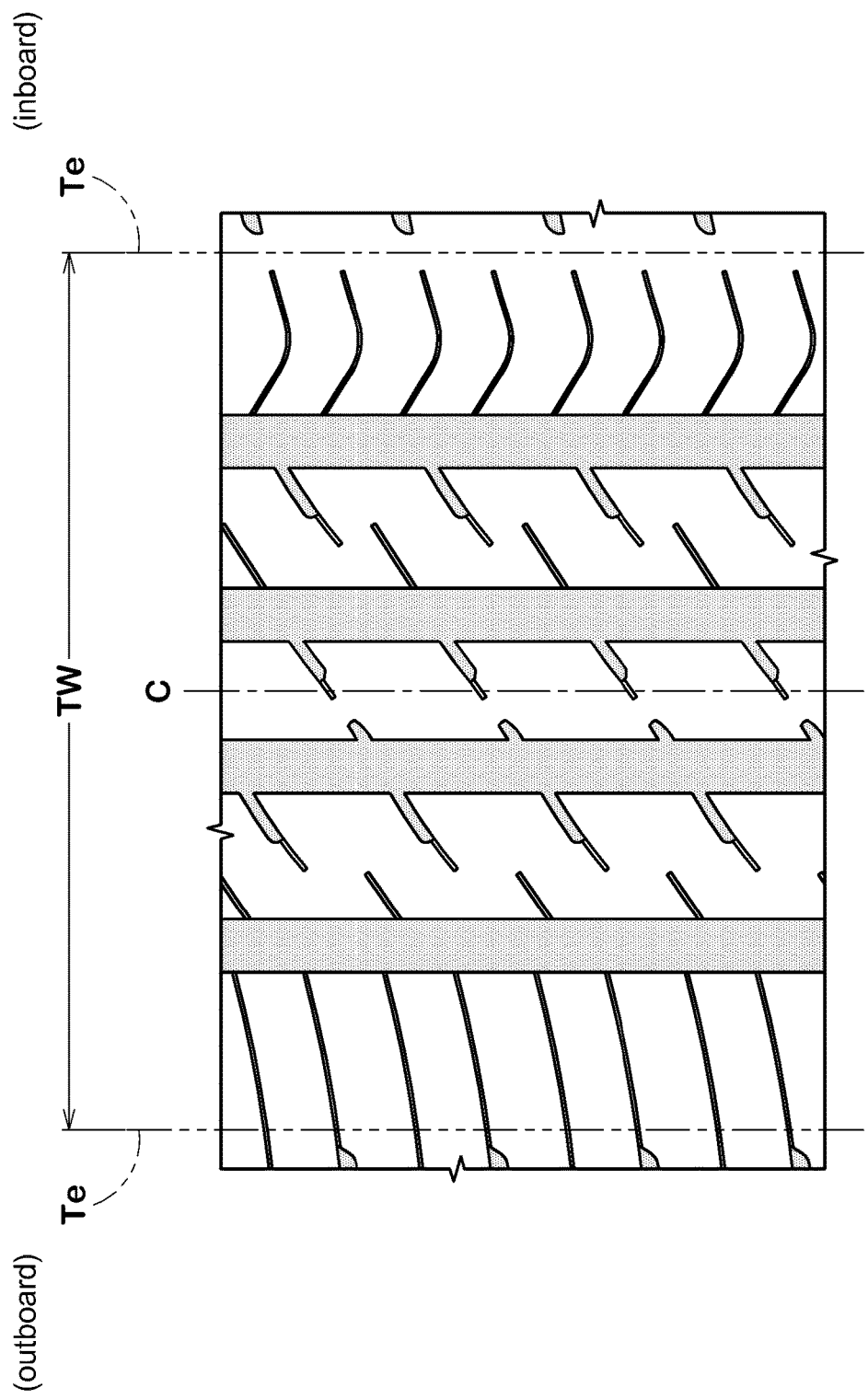
FIG. 8 is a developed partial view of a tread portion as a comparative example used in the undermentioned comparison tests.

Comparative example tire Ref. 1 had the tread pattern shown in FIG. 8, wherein all the crown main grooves and shoulder main grooves had an identical groove width, each of the center land portion, inboard middle land portion and outboard middle land portion had no turnback portions, and the inboard shoulder sipes terminated without reaching the inboard tread edge.

Comparative example tires Refs. 2-11 had tread patterns modified based on the tread pattern shown in FIG. 8.

<Wet Performance Test>

A test car (2400 cc front-wheel drive passenger car) provided on all four wheels with test tires (tire pressure 220 kpa) was run along a 100 meter radius circle on an asphalt road partially provided with a 10 mm depth 20 m long water pool, and the lateral acceleration (lateral G) during running in the water pool was measured at the front wheels, gradually increasing the speed entering into the water pool, to obtain the average for the speed range of from 50 to 80 km/h.

The results are indicated in Table 1 by an index based on Comparative example tire Ref. 4 being 100, wherein the larger is better.

<Steering Stability Test>

The above-mentioned test car was run on a dry asphalt road in a test course, and the test driver evaluated steering stability based on the handle response, rigidity, grip and the like.

The results are indicated by an index based on Comparative example tire Ref. 2 being 100, wherein the larger the index number, the better the steering stability.

<Noise Performance Test>

According to the "Test Procedure for Tire Noise" specified in Japanese JASO-C606, the test car was coasted for 50 meter distance at a speed of 60 km/h on an asphalt road surface of a straight test course, and the maximum noise sound level dB(A) (pass-by noise) was measured with a microphone set at 1.2 meter height from the road surface and 7.5 meter sideways from the running center line in the midpoint of the course.

The results are indicated by an index based on Comparative example tire Ref. 2 being 100, wherein the larger the index number, the smaller the pass-by noise.

From the test results, it was confirmed that, according to the present invention, the noise performance can be improved without sacrificing the wet performance and the steering stability.

TABLE 1

| Tire | Ref. 1 | Ref. 2 | Ref. 3 | Ref. 4 | Ref. 5 | Ref. 6 | Ref. 7 | Ref. 8 | Ref. 9 | Ref. 10 | Ref. 11 |
|---|---|---|---|---|---|---|---|---|---|---|---|
| width W1 of inboard crown main groove (mm) | 11.3 | 11.3 | 11.3 | 11.3 | 11.3 | 11.3 | 11.3 | 11.3 | 11.3 | 11.3 | 11.3 |
| width W2 of outboard crown main groove (mm) | 11.3 | 11.3 | 11.3 | 11.3 | 11.3 | 11.3 | 11.3 | 11.3 | 11.3 | 11.3 | 11.3 |
| width W3 of inboard shoulder main groove (mm) | 11.3 | 11.3 | 11.3 | 9.0 | 9.0 | 9.0 | 11.3 | 11.3 | 9.0 | 11.3 | 9.0 |
| width W4 of outboard shoulder main groove (mm) | 11.3 | 11.3 | 11.3 | 7.2 | 7.2 | 7.2 | 11.3 | 11.3 | 7.2 | 11.3 | 7.2 |
| inboard middle axial groove configuration (*1) | FIG. 8 | FIG. 7 | FIG. 7 | FIG. 8 | FIG. 8 | FIG. 8 | FIG. 8 | FIG. 8 | FIG. 7 | FIG. 7 | FIG. 8 |
| outboard middle axial groove configuration (*1) | FIG. 8 | FIG. 7 | FIG. 7 | FIG. 7 | FIG. 8 | FIG. 7 | FIG. 8 | FIG. 7 | FIG. 8 | FIG. 8 | FIG. 8 |
| inboard center axial groove configuration (*1) | FIG. 8 | FIG. 7 | FIG. 7 | FIG. 8 | FIG. 7 | FIG. 7 | FIG. 8 | FIG. 7 | FIG. 8 | FIG. 8 | FIG. 8 |
| inboard shoulder sipe configuration (*2) | FIG. 8 | FIG. 8 | FIG. 8 | FIG. 8 | FIG. 8 | FIG. 8 | FIG. 7 | FIG. 7 | FIG. 8 | FIG. 7 | FIG. 7 |
| number of inboard shoulder sipes/number of inboard middle axial grooves | 1.8 | 1.8 | 1.8 | 1.8 | 1.8 | 1.8 | 1.8 | 1.8 | 1.8 | 1.8 | 1.8 |
| length L3 of inboard middle sipe/width W6 of inboard middle land portion | 0.6 | 0.6 | 0.6 | 0.6 | 0.6 | 0.6 | 0.6 | 0.6 | 0.6 | 0.6 | 0.6 |
| outboard shoulder land portion configuration (*3) | FIG. 8 | FIG. 8 | FIG. 7 | FIG. 7 | FIG. 7 | FIG. 7 | FIG. 7 | FIG. 7 | FIG. 7 | FIG. 7 | FIG. 7 |
| wet performance | 110 | 110 | 105 | 100 | 100 | 100 | 107 | 110 | 102 | 108 | 97 |
| steering stability | 105 | 100 | 100 | 105 | 110 | 105 | 109 | 100 | 107 | 109 | 116 |
| noise performance | 95 | 100 | 105 | 110 | 108 | 110 | 104 | 110 | 110 | 105 | 110 |

| Tire | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| width W1 of inboard crown main groove (mm) | 11.3 | 11.3 | 11.3 | 11.3 | 11.3 | 11.3 | 11.3 | 11.3 | 11.3 | 11.3 | 11.3 |
| width W2 of outboard crown main groove (mm) | 11.3 | 11.3 | 11.3 | 11.3 | 11.3 | 11.3 | 11.3 | 11.3 | 11.3 | 11.3 | 11.3 |
| width W3 of inboard shoulder main groove (mm) | 9.0 | 9.0 | 9.0 | 9.0 | 9.0 | 9.0 | 9.0 | 9.0 | 9.0 | 9.0 | 9.0 |
| width W4 of outboard shoulder main groove (mm) | 7.2 | 7.2 | 7.2 | 7.2 | 7.2 | 7.2 | 7.2 | 7.2 | 7.2 | 7.2 | 7.2 |
| inboard middle axial groove configuration (*1) | FIG. 7 | FIG. 7 | FIG. 7 | FIG. 7 | FIG. 7 | FIG. 7 | FIG. 7 | FIG. 7 | FIG. 7 | FIG. 7 | FIG. 7 |
| outboard middle axial groove configuration (*1) | FIG. 8 | FIG. 7 | FIG. 7 | FIG. 7 | FIG. 8 | FIG. 8 | FIG. 8 | FIG. 7 | FIG. 8 | FIG. 8 | FIG. 8 |
| inboard center axial groove configuration (*1) | FIG. 8 | FIG. 7 | FIG. 8 | FIG. 8 | FIG. 7 | FIG. 8 | FIG. 7 | FIG. 7 | FIG. 7 | FIG. 8 | FIG. 8 |
| inboard shoulder sipe configuration (*2) | FIG. 7 | FIG. 7 | FIG. 7 | FIG. 7 | FIG. 7 | FIG. 7 | FIG. 7 | FIG. 7 | FIG. 7 | FIG. 7 | FIG. 7 |
| number of inboard shoulder sipes/number of inboard middle axial grooves | 1.8 | 1.8 | 1.8 | 1.8 | 1.8 | 1.8 | 1.8 | 1.8 | 1.0 | 1.8 | 1.8 |
| length L3 of inboard middle sipe/width W6 of inboard middle land portion | 0.6 | 0.6 | 0.6 | 0.6 | 0.6 | 0.6 | 0.6 | 0.6 | 0.6 | 0.4 | 0.8 |
| outboard shoulder land portion configuration (*3) | FIG. 7 | FIG. 7 | FIG. 8 | FIG. 7 | FIG. 8 | FIG. 7 | FIG. 8 | FIG. 8 | FIG. 7 | FIG. 7 | FIG. 7 |

TABLE 1-continued

| | | | | | | | | | | | |
|---|---|---|---|---|---|---|---|---|---|---|---|
| wet performance | 105 | 105 | 105 | 108 | 105 | 105 | 107 | 110 | 103 | 100 | 110 |
| steering stability | 120 | 115 | 112 | 110 | 110 | 110 | 110 | 108 | 121 | 120 | 110 |
| noise performance | 115 | 115 | 114 | 113 | 115 | 115 | 112 | 112 | 115 | 115 | 115 |

(*1) FIG. 7: The inboard middle axial grooves, the outboard middle axial grooves and the inboard center axial grooves were each provided with the turnback portion.
FIG. 8: the inboard middle axial grooves, the outboard middle axial grooves and the inboard center axial grooves were not provided with the turnback portion.
(*2) FIG. 7: The inboard shoulder sipes were extended to the inboard tread edge.
FIG. 8: The inboard shoulder sipes were terminated without reaching the inboard tread edge.
(*3) FIG. 7: The outboard shoulder land portion had the non-grooved rib-like part.
FIG. 8: The outboard shoulder land portion have not the non-grooved rib-like part.

The invention claimed is:

1. A pneumatic tire comprising:
a tread portion provided with a tread pattern of left-right asymmetry and having an outboard tread edge and an inboard tread edge,
the tread pattern comprising circumferentially continuously extending main grooves which are
an inboard shoulder main groove, an inboard crown main groove, an outboard crown main groove, and an outboard shoulder main groove, whereby
the tread portion is axially divided into
an inboard shoulder land portion between the inboard shoulder main groove and the inboard tread edge,
an inboard middle land portion between the inboard crown main groove and the inboard shoulder main groove,
a center land portion between the inboard crown main groove and the outboard crown main groove,
an outboard middle land portion between the outboard crown main groove and the outboard shoulder main groove, and
an outboard shoulder land portion between the outboard shoulder main groove and the outboard tread edge, wherein
the width of the outboard shoulder main groove is smaller than the width of the inboard shoulder main groove,
the tread pattern further comprises bent middle axial grooves arranged circumferentially of the tire at intervals, and disposed in the inboard middle land portion but not disposed in the outboard middle land portion,
each of the bent middle axial grooves comprises:
a main portion which extends from the inboard shoulder main groove toward the tire equator, while inclining with respect to the tire axial direction to one tire circumferential direction, and
a turnback portion which extends from the main portion toward the other tire circumferential direction and terminates within the inboard middle land portion, wherein
the main portion and turnback portion are substantially straight, and intersect with each other at an acute angle,
the inboard shoulder land portion is provided with a plurality of inboard shoulder sipes arranged circumferentially of the tire at intervals, and each extending from the inboard shoulder main groove to the inboard tread edge, and
the outboard shoulder land portion is provided with an annular part and an axially inner non-grooved rib part and the rib part extending continuously and circumferentially of the tire and disposed adjacently to the outboard shoulder main groove, and
the annular part provided with a plurality of outboard shoulder sipes arranged circumferentially of the tire at intervals.

2. The pneumatic tire according to claim 1, wherein
said turnback portion extends parallel with the tire circumferential direction.

3. The pneumatic tire according to claim 2, wherein
the number of the inboard shoulder sipes is more than the number of the bent middle axial grooves.

4. The pneumatic tire according to claim 2, wherein
the inboard middle land portion is provided with a plurality of inboard middle sipes arranged circumferentially of the tire at intervals, and
each of the inboard middle sipes extends axially outwardly from the inboard crown main groove and terminates within the inboard middle land portion.

5. The pneumatic tire according to claim 2, wherein
the bent middle axial grooves have a width, and
the inboard crown main groove and the outboard crown main groove have a width more than the width of the bent middle axial grooves.

6. The pneumatic tire according to claim 1, wherein
the number of the inboard shoulder sipes is more than the number of the bent middle axial grooves.

7. The pneumatic tire according to claim 6, wherein
the inboard middle land portion is provided with a plurality of inboard middle sipes arranged circumferentially of the tire at intervals, and
each of the inboard middle sipes extends axially outwardly from the inboard crown main groove and terminates within the inboard middle land portion.

8. The pneumatic tire according to claim 6, wherein
the bent middle axial grooves have a width, and
the inboard crown main groove and the outboard crown main groove have a width more than the width of the bent middle axial grooves.

9. The pneumatic tire according to claim 1, wherein
the inboard middle land portion is provided with a plurality of inboard middle sipes arranged circumferentially of the tire at intervals, and each extending axially outwardly from the inboard crown main groove and terminates within the inboard middle land portion, and
the outboard middle land portion is provided with
a plurality of outboard middle axial grooves arranged circumferentially of the tire at intervals and each extending axially outwardly from the outboard crown main groove to terminate within the outboard middle land portion, and
a plurality of outboard middle sipes arranged circumferentially of the tire at intervals and each extending axially inwardly from the outboard shoulder main groove to terminate within the outboard middle land portion.

10. The pneumatic tire according to claim 9, wherein
the axial outer ends of the inboard middle sipes are located axially outside the turnback portions.

11. The pneumatic tire according to claim 10, wherein
the bent middle axial grooves have a width, and
the inboard crown main groove and the outboard crown main groove have a width more than the width of the bent middle axial grooves.

12. The pneumatic tire according to claim 9, wherein
the bent middle axial grooves have a width, and
the inboard crown main groove and the outboard crown main groove have a width more than the width of the bent middle axial grooves.

13. The pneumatic tire according to claim 1, wherein
the bent middle axial grooves have a width, and
the inboard crown main groove and the outboard crown main groove have a width more than the width of the bent middle axial grooves.

14. The pneumatic tire according to claim 1, wherein
the inboard crown main groove has a width, and the outboard crown main groove has a width same as the width of the inboard crown main groove.

* * * * *